United States Patent
Lindgren et al.

(10) Patent No.: US 9,332,062 B2
(45) Date of Patent: May 3, 2016

(54) METHOD AND ARRANGEMENT FOR PROVIDING DOCUMENTS

(75) Inventors: Anders Lindgren, Alvsjo (SE);
Christer Boberg, Tungelsta (SE);
Mikael Klein, Huddinge (SE); Sofie Lassborn, Sollentuna (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 296 days.

(21) Appl. No.: 13/979,471

(22) PCT Filed: Jan. 13, 2011

(86) PCT No.: PCT/EP2011/050377
§ 371 (c)(1),
(2), (4) Date: Sep. 18, 2013

(87) PCT Pub. No.: WO2012/095174
PCT Pub. Date: Jul. 19, 2012

(65) Prior Publication Data
US 2014/0006557 A1    Jan. 2, 2014

(51) Int. Cl.
*G06F 15/16* (2006.01)
*H04L 29/08* (2006.01)
(Continued)

(52) U.S. Cl.
CPC ............ *H04L 67/10* (2013.01); *G06F 17/3089* (2013.01); *G06F 17/30926* (2013.01); *H04L 41/5035* (2013.01); *H04L 63/102* (2013.01); *H04L 67/303* (2013.01)

(58) Field of Classification Search
CPC .............. H04L 41/0266; H04L 63/123; H04L 41/5035; H04L 63/102; H04L 67/10; H04L 67/303

USPC ................... 709/227, 248, 217, 219
See application file for complete search history.

(56) References Cited

U.S. PATENT DOCUMENTS 8,092,277 B2 *   1/2012   Hashii et al. .................... 451/41
8,224,964 B1 *   7/2012   Fredrickson et al. ......... 709/227
(Continued)

OTHER PUBLICATIONS

Prati, L., et al., "XDMS—Network Address Book Enabler", IP Multimedia Subsystem Architecture and Applications, 2007 International Conference On, IEEE, Piscataway, NJ, USA, Dec. 6, 2007, pp. 1-4, XP031283339.

(Continued)

*Primary Examiner* — Kristie Shingles
(74) *Attorney, Agent, or Firm* — Patents on Demand, P.A.; Brian K. Buchheit; Scott M. Garrett

(57) ABSTRACT

A method and arrangement for handling document requests in a communication services network. When a first document server (200) receives (2:1) a request for a first service document from a requesting party (200), the requested first service document (Doc 1) is retrieved (2:2), which comprises a reference (ref) to service related information in a second service document (Doc 2). The first document server (200) then fetches (2:3) said service related information (list) in the second service document using the information reference, and aggregates (2:4) the fetched service related information with the first service document. The first document server (200) finally returns (2:5) the first service document together with the aggregated service related information (Doc 1') to the requesting party in response to the received document request. Thereby, the requesting party is not forced to request for more documents than the first service document to obtain the needed information.

15 Claims, 3 Drawing Sheets

(51) Int. Cl.
*H04L 12/24* (2006.01)
*H04L 29/06* (2006.01)
*G06F 17/30* (2006.01)

(56) References Cited

U.S. PATENT DOCUMENTS

| | | |
|---|---|---|
| 8,335,982 B1 * | 12/2012 | Colton et al. ............ 715/234 |
| 8,533,586 B1 * | 9/2013 | Meyer et al. ............ 715/230 |
| 8,719,451 B1 * | 5/2014 | Colton et al. ............ 709/248 |
| 2005/0080768 A1 | 4/2005 | Zhang et al. |

OTHER PUBLICATIONS

Hewlett-Packard Development Company, "HP Open Call XML Document Management Server Software", Internet Citation, Jul. 2006, pp. 1-6, XP002488161.

Open Mobile Alliance Ltd, "XML Document Management Architecture, Draft Version 2.0, Feb. 15, 2007", Internet Publication, vol. OMA-AD-XDM-V2_0-20070215-D, No. Version 2.0 Feb. 2007, pp. 1-22, XP002486882.

* cited by examiner

METHOD AND ARRANGEMENT FOR PROVIDING DOCUMENTS

CROSS-REFERENCE TO RELATED APPLICATION

This application is a 35 U.S.C. §371 National Phase Entry Application from PCT/EP2011/050377, filed Jan. 13, 2011, and designating the United States.

TECHNICAL FIELD

The invention relates generally to a method and arrangement in a document server for handling document requests in a communication services network.

BACKGROUND

Today, a multitude of services can be executed in a communication services network according to specifications provided in electronic service documents. The Open Mobile Alliance OMA has defined standards for creating and handling the service documents which thus contain service related information that may be useful or required for executing one or more services and applications in a mobile or cellular network. According to common practice, these service documents are in the format of XML (Extensible Markup language) basically defining a set of rules for encoding documents in machine-readable form. The service documents are handled and maintained by so-called XMLDocument Management Servers, commonly referred to as "XDMS". The service documents are also commonly referred to as "XDM documents".

Service documents may be defined for specific users in a communication services network with instructions and parameters to be used for executing one or more services specifically for the users. For example, a service document may contain a list of contacts, or "friends", of the user, e.g. to be used when executing a presence service. This list may be required when executing a number of different services, each service being controlled, defined or dictated by a service document that may be user-specific or general. In order to avoid duplication of data, the list may be provided in full in just one service document while the other documents contain a brief reference to the list for retrieval from the former document. In this way, the same list or the like with information can be reused in multiple service documents without duplication of all data therein.

In other examples, a set of instructions, rules or policies may be provided in full in one document and a reference thereto may be included in other service documents requiring the same information. In this description, the term "service related information" will be used to represent any information needed for executing a communication service, such as the above mentioned examples of a contact or member list, and a set of instructions, rules and/or policies.

When a user terminal, an application server or the like shall execute a specific service for a user, the terminal or server will fetch the corresponding service document from a document server. If the fetched document contains a reference to a list or other service related information available in another service document, that other document must be fetched as well, possibly from another document server, in order to obtain all necessary information for executing the service. Any terminal or server that retrieves a service document from a document server, e.g. for executing a communication service or application, will be referred to as a "requesting party" in the following.

FIG. 1 is a signalling diagram illustrating a scenario when a requesting party 100 retrieves service related information required for executing a specific service for a user, according to a conventional solution. In a first shown action 1:1, the requesting party 100 sends a request for a first document "Doc 1" to a first document server 102 from which the document can be retrieved. The document server 102 then retrieves the first document in a next action 1:2, e.g. locally from a document storage or the like, and returns that document in a response to the requesting party 100, in a following action 1:3.

Having discovered that the received document Doc 1 contains a reference to needed service related information in a second service document, but not the information itself, the requesting party 100 is forced to send a request for the second document"Doc 2", using the information reference from Doc 1, to a second document server 104 in a further action 1:4. The document server 104 then retrieves the second document in a next action 1:5, and returns that document in a response to the requesting party 100, in a final shown action 1:6.

The requesting party 100 is thus obliged to fetch a service document twice, i.e. the first document containing service specifications and the information reference, and then the second document containing the referenced service related information, in order to obtain all information needed to execute the service. In some cases, information in more than one service document may be referenced in a first retrieved service document and/or further information references may occur in a "chain" of referenced documents, and so forth. This behavior of retrieving information from multiple documents can be rather time-consuming and also requires a certain amount of processing and messaging by the requesting party 100 as well as bandwidth for the communications involved.

Furthermore, the requesting party 100 must be capable of accessing both document servers 102 and 104 and also of understanding the structure of both its own service document Doc 1 and the referenced document Doc 2, in order to find and retrieve the needed information. Consequently, the requesting party 100 must know the host address of both document servers 102 and 104, and generally, information on document servers holding such service related information must somehow be distributed to requesting parties and be kept up-to-date as well. The above requirements generally result in a relatively complex implementation for the handling of service documents as well as undue delays, particularly when chained references are used in multiple documents.

SUMMARY

It is an object of the invention to address at least some of the problems and shortcomings outlined above. It is also an object to facilitate the process of obtaining any needed service related information for a requesting party. It is possible to achieve these objects and others by using a method and an arrangement as defined in the attached independent claims.

According to one aspect, a method is provided in a first document server for handling document requests in a communication services network. In this method, when the first document server receives a request for a first service document from a requesting party, the requested first service document is retrieved, the first document comprising a reference to service related information in a second service document. The first document server then fetches the referenced service related information in the second service document using the information reference found in the first document. The first document server further aggregates the fetched service related information with the first service document, and returns the first service document together with the aggregated service related information to the requesting party in response to the above document request.

According to another aspect, an arrangement is provided in a first document server, configured to handle document requests in a communication services network. This server arrangement comprises a request manager adapted to receive a request for a first service document from a requesting party. The server arrangement also comprises a document manager adapted to retrieve the requested first service document, the first service document comprising a reference to service related information in a second service document. The document manager is further adapted to fetch the service related information in the second service document using the information reference, and to aggregate the fetched service related information with the first service document. The request manager is further adapted to return the first service document together with the aggregated service related information to the requesting party in response to the request.

When using the method and/or arrangement above, the requesting party is not forced to request for more documents than the first service document to obtain the needed information. Thus, the process of providing information in service documents can be improved in terms of flexibility and efficiency, and without requiring excessive processing and messaging by the requesting party.

The above method and arrangement may be configured and implemented according to different optional embodiments. In some possible embodiments, the referenced service related information in the second service document may comprise any of a list of contacts or members, and a set of instructions, rules or policies for executing a communication service. However, the referenced service related information is not limited to these examples.

In another possible embodiment, the first document server fetches the referenced service related information by retrieving the second service document from a second document server. For example, the first and second service documents may be XML documents or any other type of documents that can be handled and configured as described herein.

In further possible embodiments, one or both of the first and second service documents may comprise one or more further references to service related information in one or more further service documents. In that case, the first document server fetches the service related information using the one or more further information references. For example, multiple sets of service related information may be fetched from more than one document server, and the invention is not limited in this respect.

In further possible embodiments, the first document sewer aggregates the fetched service related information in a main body of the first service document, or in a supplemental body added to the first service document. In the latter case, a local pointer to the service related information in the supplemental body can be provided in a main body of the first service document.

Rather, the first document server may, without limitation, detect that document aggregation is required based on any of: the identity of the requesting party, a source address provided in the request, and an aggregation indicator provided in the request. The first document sewer may also include an entity tag in the response to the requesting party, the entity tag being associated with the aggregated service related information. Thereby, the requesting party is able to include the entity tag in a subsequent document request to indicate whether an updated version of the service related information is needed. The first document server can then determine, upon the subsequent document request, that the response did include the aggregated information.

Further possible features and benefits of this solution will become apparent from the detailed description below.

BRIEF DESCRIPTION OF DRAWINGS

The invention will now be described in more detail by means of exemplary embodiments and with reference to the accompanying drawings, in which.

DETAILED DESCRIPTION

Briefly described, a solution is provided in a first document server to facilitate the process of obtaining service related information from one or more service documents for a requesting party. When the first document server receives a request for a service document from a requesting party, the requested document is first retrieved. If the requested document contains a reference to some service related information, which is available from another service document that may be maintained at a second document server or at the first document server, the first document server will fetch that service related information in the latter service document using the information reference in the requested document.

The first document server then "aggregates" the fetched service related information with the requested service document, meaning that the service related information from the other service document is extracted therefrom and integrated in a suitable manner together with the requested service document. The first document server finally returns the first service document together with the aggregated service related information, to the requesting party in response to the received document request. Thereby, the requesting party is not forced to request for more documents than the first service document.

The above aggregation can be done either by entering the service related information into a data field of a main body of the requested service document, if the structure or schema of that document allows to accommodate the information, or by adding a supplementary body to the main body of the requested service document where the service related information is included in the supplementary body. In the former case, it may be useful to somewhat process the information before fitting it into the main body of the document, e.g. by removing any needless duplication of data between the two documents.

An example of how this solution can be used will now be described with reference to the signalling diagram in FIG. 2, involving at least a requesting party 200 and a first document server 202 in a communication services network. The requesting party 200 may be an application server or a user terminal that has been activated to execute a specific service or application in the network, which requires retrieval of a corresponding service document that contains various service related data such as, e.g., a service description, instructions, parameters, etc., needed for executing the service.

Figure 1:
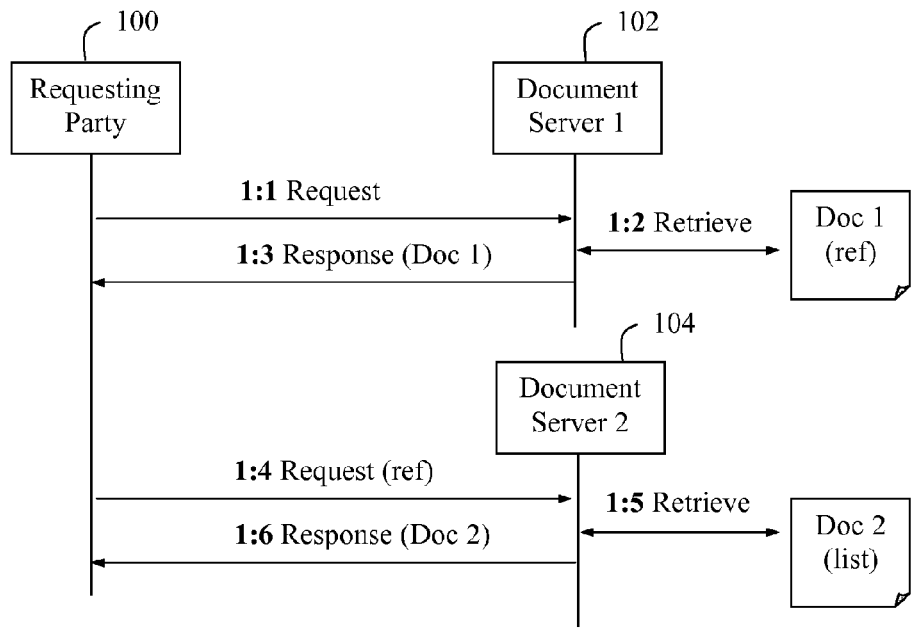
FIG. 1 is a signalling diagram illustrating the retrieval of service related information for executing a service, according to the prior art.

In a first shown action 2:1, the requesting party 200 sends a request for a needed first service document "Doc 1" to the first document server 202 from which the document can be retrieved. The document server 202 then retrieves the first document in a next action 2:2, e.g. from a local document storage or the like at server 202. Alternatively, document server 202 may retrieve the requested document from an external document storage or the like and the invention is not limited in this respect. So far, the procedure is basically similar to that of actions 1:1 and 1:2 in FIG. 1.

The first document server 202 discovers that the first service document Doc 1 contains an information reference "ref", effectively pointing to some service related information in a second service document "Doc 2". The referenced service related information in the second service document may comprise any of: a list of contacts or members, and a set of instructions, rules or policies for executing a communication service. Further, the first and second service documents may be XML documents or any other type of documents that can be handled and used in the manner described herein.

In this example, the second service document Doc 2 is available from a second document server 204. In another possible example, not shown, document Doc 2 may be available at the first document server 202 and can be retrieved in the same way as the first service document Doc 1 in that case. In this example, however, the first document server 202 fetches the service related information in document Doc 2 using the information reference, from the second document server 204, in a next action 2:3. A dashed two-way arrow indicates that server 204 retrieves the second service document Doc 2, e.g. as similar to action 1:5 of FIG. 1. In action 2:3, the second document server 204 may provide the complete document Doc 2 or just the referenced service related information, to server 202.

As mentioned above, it is also possible that one or both of the first and second service documents comprise one or more further references to service related information in one or more further service documents, e.g. in a "chained" manner. In that case, the first document server 202 can fetch service related information from corresponding document servers using the one or more further information references in any of the first and second service documents.

Ina next shown action 2:4, the first document server 202 aggregates the fetched service related information with the first service document which will be described in more detail later below. Server 202 then finally returns the first service document Doc 1 together with the aggregated service related information (ref), effectively as a modified first service document Doc 1', to the requesting party in response to the above request, in a last shown action 2:5.

An exemplifying procedure for handling a document request from a requesting party, will now be described with reference to the flow chart in FIG. 3. The shown actions in this process can be executed by a first document server, such as the server 202 in FIG. 2. In a first action 300, the first document server receives a request for a first service document from the requesting party, basically corresponding to action 2:1 in FIG. 2. The first document server then retrieves the requested first service document, in a next action 302, basically corresponding to action 2:2 in FIG. 2. At this point in the shown procedure, the retrieved first service document may or may not comprise a reference to service related information in a second service document.

It is then determined in a further action 304 whether aggregation of any service related information from another document into the requested document is required for the requesting party, which can be determined in different ways. For example, the first document server may detect that the document aggregation is required based on any of the identity of the requesting party, a source address provided in the request, and an aggregation indicator provided in the request. The identity of the requesting party may be indicated by a user agent having a certain value in the request. The source address in the request may be a host and/or IP (Internet Protocol) address. The aggregation indicator may be a certain header in the request basically indicating that the requesting party is capable of handling "aggregated documents".

If no document aggregation is required for the requesting party according to action 304, the first document server returns the requested first service document "as is" to the requesting party, i.e. without any modifications, in an action 306. It is then up to the requesting party to request for second service document in order to obtain the service related information therefrom, e.g. according to the regular procedure described in FIG. 1, which is however outside this process.

If it is found in action 304 that document aggregation is indeed required for the requesting party, the first document server determines whether the retrieved first service document comprises any reference to service related information in another service document, in an action 308. If not, the requested first service document can be returned "as is" to the requesting party according to action 306. If a reference to service related information is present in the first service document, the first document server fetches the service related information in a second service document, using the information reference, in a further action 310, basically corresponding to action 2:3 in FIG. 2. For example, the information reference may be a network address or the like pointing to the second service document in another document server.

Figure 2:
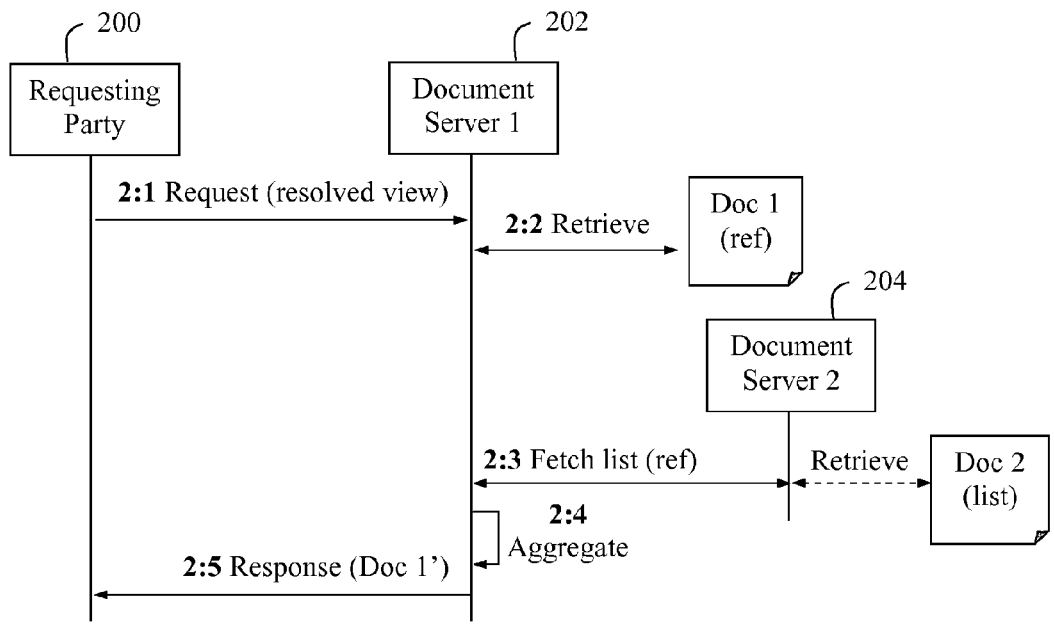
FIG. 2 is a signalling diagram illustrating the retrieval of service related information for executing a service, according to an exemplifying embodiment.
Figure 3:
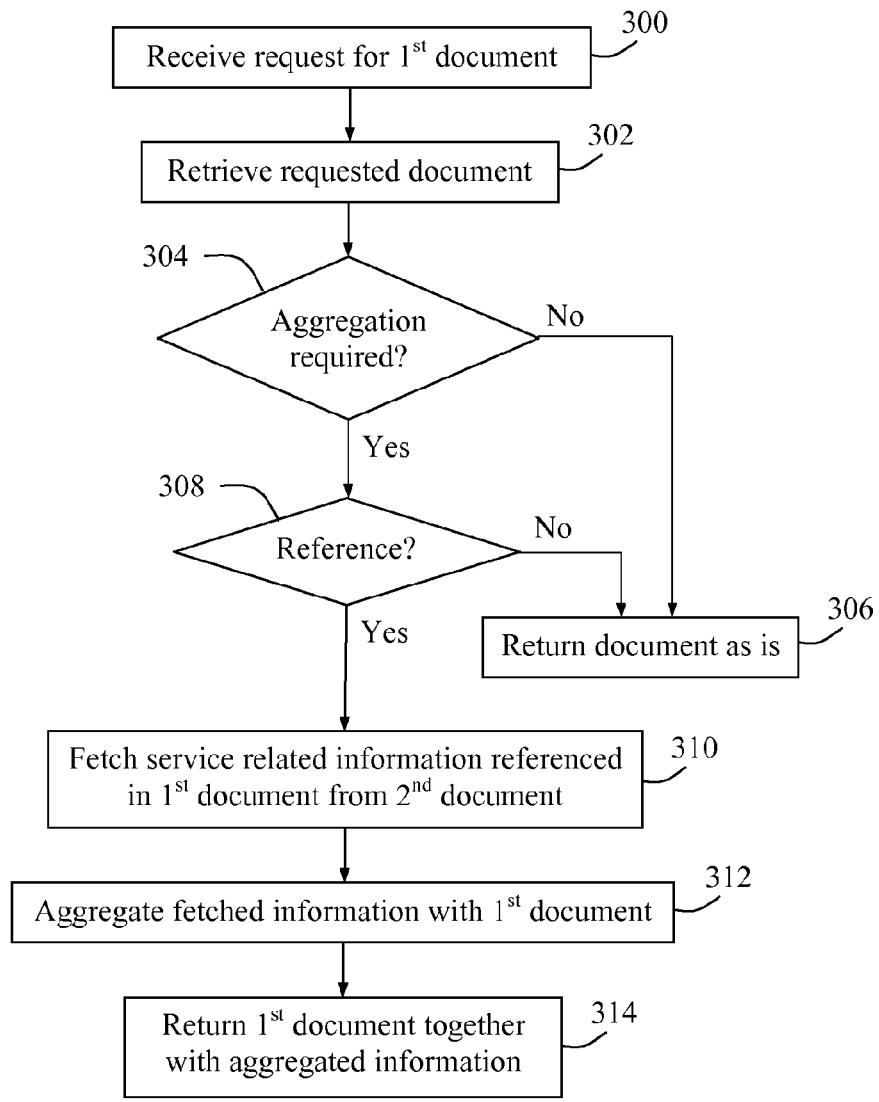
FIG. 3 is a flow chart of a procedure for handling a document request in a first document server, according in a further possible embodiment.

The first document server then aggregates the fetched service related information with the first service document, in a further action 312, basically corresponding to action 2:4 in FIG. 2. This document aggregation may be done e.g. according to any of the examples described below for FIGS. 4a and 4b. The first document server finally returns the first service document together with the aggregated service related information to the requesting party in response to the above document request, in a following action 314, basically corresponding to action 2:5 in FIG. 2.

An entity tag associated with the aggregated service related information may also be included in the response to the requesting party in action 314. The entity tag effectively refers to the content or "version" of the service related information that was delivered in the requesting party. Thereby, the requesting party is able to include the entity tag in any subsequent request to indicate whether an updated version of the service related information is needed or not. In a practical example, this entity tag may be different from an entity tag associated with only the first service document so that the first document server can determine, upon a subsequent document request, whether the previous response did include the aggregated information or just the first document.

When receiving the subsequent request with the above entity tag included, the first document server is able to decide, based on the entity tag, whether the service related information has been changed since the last delivery or not. If it has changed, a new updated version of the service related information can be sent to the requesting party, aggregated with the requested service document as described above. Alternatively, only the changed parts of the service related information may be aggregated with the requested service document when delivered to the requesting party, depending on the implementation. If the service related information has not changed at all since last delivered, according to the entity tag, the first document server may return the requested document without any aggregated service related information, thereby implying that the previously delivered version of the service related information is still valid and can be used by the requesting party for executing the service.

Figure 4A:
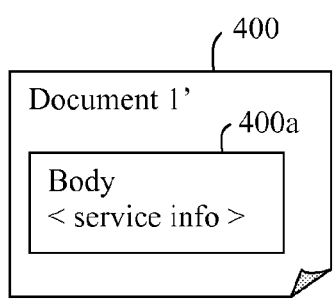
FIGS. 4a and 4b are examples of how service documents can be configured when delivered, according to further possible embodiments.
Figure 4B:
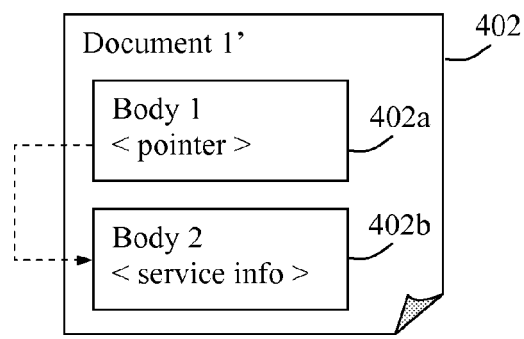

As mentioned above, the aggregation of the service related information with the first service document in actions 2:4 and 312, respectively, can be done in different ways and two useful examples are illustrated in FIGS. 4a and 4b. In the first example of FIG. 4a, the service related information "service info" may be inserted in a regular data field of a main body 400a in the first service document 400, the data field being configured for holding such service related information or any reference thereto. This option is possible if that field is able to accommodate the entire service related information, e.g. depending on the structure or schema of the first service document 400.

In the second example of FIG. 4b, the service related information is aggregated with the first service document 402 by adding a supplementary body 402b, denoted "Body 2", to a main body 402a, denoted "Body 1", of the document 402, where the service related information "service info" is included in the supplementary body 402b. In that case, a pointer is added to the main body 402a, thus pointing to the service related information in the supplementary body 402b, as indicated by the dashed arrow. This option is useful if a data field configured for holding service related information in the first service document is, for whatever reason, not able to accommodate the service related information fetched from the second service document. Depending on the implementation, the pointer in the main body 402a may point either generally to the supplementary body 402b and/or specifically to the service related information therein.

As indicated above, the service related information may be processed in a suitable manner before aggregating it with the first service document, e.g. by removing any needless duplication of data between the two documents e.g. when comprising two overlapping contact lists. In further examples, any non-relevant or overlapping service related information may be removed, e.g. based on information about the requesting party. For example, a presence server may request for a document containing presence authorization rules, which also has a reference to a contact list in another service document. Each member in the contact list has an identity (e.g. a "TELURI"), but the list may also include further information on the members such as gender, postal address, hobbies, preferences, etc. During the aggregation in this case, everything apart from the member identities can be removed as it is only this information that is relevant and needed for the presence authorization rules.

In another example, any conflicting information from a referenced document may be prioritized. It is possible that one document has a rule that allows one thing while another document has a rule that effectively blocks the very same thing. During aggregation, this conflict can be resolved such that only one of those rules is returned to the requesting party. In this way, it can be avoided that two requesting parties take opposite decisions on which rule to use.

Figure 5:
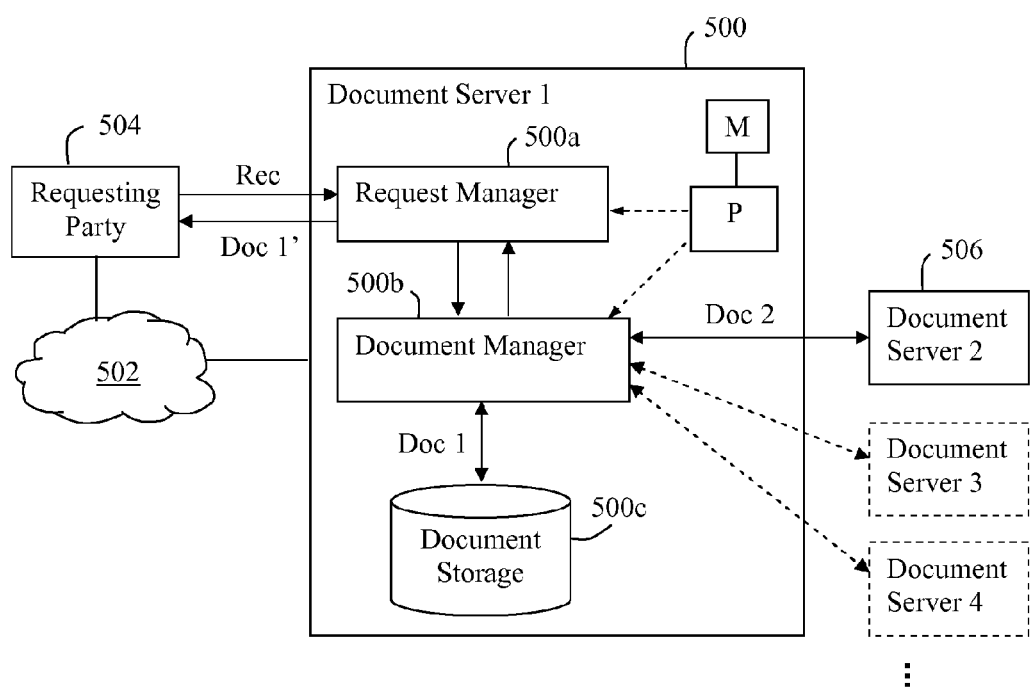
FIG. 5 is a block diagram illustrating an exemplifying arrangement in a document server, according to further possible embodiments.

A more detailed but non-limiting example of how an arrangement can be implemented in a first document server to accomplish the solution, is illustrated by the block diagram in FIG. 5. Various actions and messages are also schematically indicated in this figure. The first document server 500 is configured in handle document requests in a communication services network 502, e.g. in the manner described above for any of FIGS. 2-4.

According to this arrangement, the first document server 500 comprises a request manager 500a used for handling requests from requesting parties for service documents. The request manager 500a is thus adapted in receive a request "Rec" for a first service document from a requesting party 504. The first document server 500 further comprises a document manager 500b adapted to retrieve the requested first service document "Doc 1" which comprises a reference to service related information in a second service document "Doc 2".

The document manager 500b is further adapted to fifth the referenced service related information in the second service document using the information reference in the first service document. The document manager 500b is also adapted to aggregate the fetched service related information with the first service document. The request manager 500a is further adapted to return the first service document together with the aggregated service related information as a modified first service document "Doc 1" to the requesting party 504 in response to the above request.

It should be noted that FIG. 5 merely illustrates various functional modules or units in the first document server 500 in a logical sense, although the skilled person is free to implement these functions in practice using suitable software and hardware means. Thus, the invention is generally not limited to the shown structures of the first document server 500, while its functional modules 500a and 500b may be configured to operate according to the features described for any of FIGS. 2-4 above, where appropriate.

The functional modules 500a and 500b described above can be implemented in the server 500 as program modules of a computer program comprising code means which when run by a processor "P" in the server 500 causes the server 500 to perform the above-described functions and actions. The processor P may be a single CPU (Central processing unit), or could comprise two or more processing units. For example, the processor P may include general purpose microprocessors, instruction set processors and/or related chips sets and/or special purpose microprocessors such as ASICs (Application Specific Integrated Circuit). The processor P may also comprise a memory for caching purposes.

The computer program may be carried by a computer program product in the first document server 500 in the form of a memory "M" connected to the processor P. The computer program product or memory M comprises a computer readable medium on which the computer program is stored. For example, the memory M may be a flash memory, a RAM (Random-access memory), a ROM (Read-Only Memory) or an EEPROM (Electrically Erasable Programmable EOM), and the program modules could in alternative embodiments be distributed on different computer program products in the form of memories within the first document server 500.

The above first document server 500 and functional modules 500a and 500b can be configured ID operate according ID various optional embodiments. For example, the referenced service related information in the second service document may comprise any of a list of contacts or members, and a set of instructions, rules or policies for executing a communication service. In a possible embodiment, the document manager 500b is further adapted to fetch the referenced service related information by retrieving the second service document from a second document server such as the server 204 illustrated in FIG. 2.

In another embodiment, one or both of the first and second service documents may comprise one or more further references to service related information in one or more further service documents. In that case, the document manager 500b may be further adapted to fetch the service related information, e.g. from one or more further document servers, using the one or more further information references.

In other possible embodiments, the document manager 500b may be further adapted to aggregate the service related information in a main body of the first service document, as illustrated in FIG. 4a, or in a supplemental body added to the first service document, as illustrated in FIG. 4b. In the latter case, the document manager 500b may also be adapted to provide a local pointer to the service related information in the supplemental body in a main body of the first service document, as further illustrated in FIG. 4b.

The first document server 500 may further be configured to detect that document aggregation is required based on any of the identity of the requesting party, a source address provided in the request, and an aggregation indicator provided in the request.

The document manager 500b may be further adapted to include an entity tag in the response to the requesting party, the entity tag being associated with the aggregated service related information, thereby enabling the requesting party to include the entity tag in a subsequent document request to indicate whether an updated version of the service related information is needed such that the first document server can de determine, upon the subsequent document request, that the response did include the aggregated information.

It can be understood from the above description of various possible embodiments and features of the solution, that a document handling mechanism can be achieved in the first document server allowing for both flexibility and efficiency, without requiring excessive processing and messaging by the requesting party. The desirable advantage of automatic delivery of any needed service related information aggregated with a single service document to the requesting party, can be achieved with a minimum of impact to the requesting party. As a result, the requesting party only needs to understand and handle a single service document format. Also, the requesting party only needs to request for the first service document and will still obtain the needed service related information even when fetched from further documents, thereby avoiding multiple "round-trips" and possibly also saving resources and bandwidth for wireless communication in the case of a wireless requesting party.

While the invention has been described with reference to specific exemplary embodiments, the description is generally only intended to illustrate the inventive concept and should not be taken as limiting the scope of the invention. For example, the terms "requesting party", "communication services network", "document server", "service document", "service related information", "request manager" and "document manager" have been used throughout this description, although any other corresponding nodes, functions, documents, and/or parameters could also be used having the features and characteristics described here. The invention is defined by the appended claims.

The invention claimed is:

1. A method in a first document server of handling document requests in a communication services network, the method comprising:

receiving a request for a first service document defined for a specific user for a specific service from a requesting party, retrieving the requested first service document, said first service document comprising a reference to service related information in a second service document, fetching said service related information in the second service document using the information reference, aggregating the fetched service related information with the first service document, and returning the first service document together with the aggregated service related information to the requesting party in response to said request, wherein an entity tag is included in the response to the requesting party, said entity tag being associated with the aggregated service related information, thereby enabling the requesting party to include the entity tag in a subsequent document request to indicate whether an updated version of the service related information is needed such that the first document server can determine, upon the subsequent document request, that the response did include the aggregated information.

2. The method according to claim 1, wherein said referenced service related information in the second service document comprises any of: a list of contacts or members, and a set of instructions, rules or policies for executing a communication service.

3. The method according to claim 1, wherein said referenced service related information is fetched by retrieving the second service document from a second document server.

4. The method according to claim 1, wherein the first and second service documents are XML documents.

5. The method according to claim 1, wherein one or both of said first and second service documents comprise one or more further references to service related information in one or more further service documents, and said service related information is fetched using the one or more further information references.

6. The method according to claim 1, wherein the service related information is aggregated in a main body of the first service document.

7. The method according to claim 1, wherein the service related information is aggregated in a supplemental body added to the first service document, and wherein a local pointer to the service related information in the supplemental body is provided in a main body of the first service document.

8. The method according to claim 1, wherein the first document server detects that document aggregation is required based on any of: the identity of the requesting party, a source address provided in the request, and an aggregation indicator provided in the request.

9. A first document server configured to handle document requests in a communication services network, the first document server comprising:

a receiver apparatus for receiving a request for a first service document defined for a specific user for a specific service from a requesting party, and a processor adapted to:

i) retrieve the requested first service document, said first service document comprising a reference to service related information in a second service document, ii) fetch said service related information in the second service document using the information reference, and iii) aggregate the fetched service related information with the first service document, wherein the first document server is adapted to return the first service document together with the aggregated service related information to the requesting party in response to said request, wherein the processor is further adapted to include an entity tag in the response to the requesting party, said entity tag being associated with the aggregated service related information, thereby enabling the requesting party to include the entity tag in a subsequent document request to indicate whether an updated version of the service related information is needed such that the first document server can determine, upon the subsequent document request, that the response did include the aggregated information.

10. The first document server according to claim 9, wherein said referenced service related information in the second service document comprises one or more of: a list of contacts, a list of members, a set of instructions, a set of rules, and a set of policies for executing a communication service.

11. The first document server according to claim 9, wherein the processor is further adapted to fetch said referenced service related information by retrieving the second service document from a second document server.

12. The first document server according to claim 9, wherein one or both of said first and second service documents comprise one or more further references to service related information in one or more further service documents, and processor is further adapted to fetch said service related information using the one or more further information references.

13. The first document server according to claim 9, wherein the processor is further adapted to aggregate the service related information in a main body of the first service document.

14. The first document server according to claim 9, wherein the processor is further adapted to aggregate the service related information in a supplemental body added to the first service document, and to provide a local pointer to the service related information in the supplemental body in a main body of the first service document.

15. The first document server according to claim 9, wherein the first document server is configured to detect that document aggregation is required based on any of: the identity of the requesting party, a source address provided in the request, and an aggregation indicator provided in the request.

* * * * *